(12) United States Patent
Yuasa et al.

(10) Patent No.: US 11,536,567 B2
(45) Date of Patent: Dec. 27, 2022

(54) SURVEYING INSTRUMENT

(71) Applicant: TOPCON Corporation, Tokyo-to (JP)

(72) Inventors: Taichi Yuasa, Tokyo-to (JP); Ken-ichiro Yoshino, Tokyo-to (JP)

(73) Assignee: TOPCON Corporation, Tokyo-to (JP)

( * ) Notice: Subject to any disclaimer, the term of this patent is extended or adjusted under 35 U.S.C. 154(b) by 930 days.

(21) Appl. No.: 16/123,196

(22) Filed: Sep. 6, 2018

(65) Prior Publication Data

US 2019/0078883 A1 Mar. 14, 2019

(30) Foreign Application Priority Data

Sep. 13, 2017 (JP) .............................. JP2017-175509

(51) Int. Cl.
| | |
|---|---|
| *G01C 15/00* | (2006.01) |
| *G01S 17/10* | (2020.01) |
| *G01S 7/48* | (2006.01) |
| *G01C 3/08* | (2006.01) |
| *G01S 7/484* | (2006.01) |

(Continued)

(52) U.S. Cl.
CPC ............. *G01C 15/002* (2013.01); *G01C 1/04* (2013.01); *G01C 3/08* (2013.01); *G01J 5/007* (2013.01); *G01J 5/0265* (2013.01); *G01S 7/484* (2013.01); *G01S 7/4808* (2013.01); *G01S 7/4817* (2013.01); *G01S 7/4861* (2013.01); *G01S 17/10* (2013.01); *G02B 27/1006* (2013.01)

(58) Field of Classification Search
None
See application file for complete search history.

(56) References Cited

U.S. PATENT DOCUMENTS

| | | | |
|---|---|---|---|
| 9,551,575 B2 * | 1/2017 | Bridges | G01S 17/36 |
| 9,733,081 B2 * | 8/2017 | Zimmermann | G01C 15/06 |

(Continued)

FOREIGN PATENT DOCUMENTS

| | | |
|---|---|---|
| EP | 2602588 A1 | 6/2013 |
| EP | 2722645 A2 | 4/2014 |

(Continued)

OTHER PUBLICATIONS

European communication dated Feb. 12, 2019 in corresponding European patent application No. 18194114.7.

*Primary Examiner* — Yuqing Xiao
*Assistant Examiner* — Jempson Noel
(74) *Attorney, Agent, or Firm* — Nields, Lemack & Frame, LLC

(57) ABSTRACT

A surveying instrument comprises a light projecting optical system for projecting a distance measuring light to a predetermined measuring point, a light receiving optical system for receiving a reflected distance measuring light and an infrared light from the measuring point, and an arithmetic control module for controlling a distance measurement and a temperature measurement based on light receiving results of the reflected distance measuring light and the infrared light, and the arithmetic control module measures a distance to the measuring point based on light receiving results of the reflected distance measuring light received by a photodetector of the light receiving optical system, and measures a temperature of the measuring point based on light receiving results of the infrared light received by a temperature sensor of the light receiving optical system.

6 Claims, 9 Drawing Sheets

(51) Int. Cl.
  *G01S 7/4861* (2020.01)
  *G01J 5/00* (2022.01)
  *G01J 5/02* (2022.01)
  *G01S 7/481* (2006.01)
  *G01C 1/04* (2006.01)
  *G02B 27/10* (2006.01)

(56) References Cited

U.S. PATENT DOCUMENTS

| | | | |
|---|---|---|---|
| 10,082,521 B2* | 9/2018 | Atlas | G01S 3/783 |
| 10,302,413 B2* | 5/2019 | Bridges | G01S 7/491 |
| 2004/0119020 A1* | 6/2004 | Bodkin | H04N 5/332 |
| | | | 250/353 |
| 2008/0120856 A1* | 5/2008 | Matsuo | G01C 15/00 |
| | | | 33/299 |
| 2010/0091263 A1* | 4/2010 | Kumagai | G01S 17/10 |
| | | | 356/4.01 |
| 2011/0032507 A1* | 2/2011 | Braunecker | G01C 15/002 |
| | | | 356/5.01 |
| 2013/0278759 A1 | 10/2013 | Zimmerman et al. | |
| 2014/0063489 A1 | 3/2014 | Steffey et al. | |
| 2014/0111618 A1* | 4/2014 | Kumagai | G01C 15/002 |
| | | | 348/46 |
| 2016/0320473 A1 | 11/2016 | Matsumoto et al. | |
| 2016/0349050 A1 | 12/2016 | Yoshino | |
| 2016/0349051 A1* | 12/2016 | Kumagai | G01S 17/42 |
| 2017/0094251 A1* | 3/2017 | Wolke | H04N 13/246 |
| 2020/0326187 A1* | 10/2020 | Ohhashi | B64C 39/024 |

FOREIGN PATENT DOCUMENTS

| | | |
|---|---|---|
| EP | 2718669 B1 | 8/2016 |
| JP | 2006-38798 A | 2/2006 |
| JP | 2016-211873 A | 12/2016 |
| JP | 2016-223840 A | 12/2016 |
| JP | 2017-519188 A | 7/2017 |
| WO | 2015/164117 A1 | 10/2015 |

\* cited by examiner

SURVEYING INSTRUMENT

BACKGROUND OF THE INVENTION

The present invention relates to a surveying instrument which executes a surveying and a temperature measurement of an object to be measured at the same time.

In surveying instruments such as a total station or a laser scanner or the like, there is one which has a temperature measurement device such as an infrared camera and the like, additionally and separately provided so that a temperature information is added to a positional information acquired by the surveying.

In conventional surveying instruments, a temperature measurement device is provided on a main body of a surveying instrument, and is non-coaxial with a distance meter or a visible light camera. In a short-range surveying in particular, since a deviation between a surveying position and a temperature measuring position becomes conspicuous, an accuracy of the temperature information with respect to the positional information at a desired measuring point becomes low. Further, in order to improve an accuracy at a time of adding of the temperature information with respect to the positional information, a correction of a positional displacement becomes necessary, and a signal processing becomes complicated.

Further, since the temperature measurement device is mounted on a fixed portion of the main body, the temperature measurement device cannot vertically rotate integrally with a telescope unit of the total station or a scanning mirror of the laser scanner. Therefore, in order to add the temperature information to the positional information over a wide range, corresponding to a measurement range of the total station or the laser scanner, an infrared camera with a super wide-angle must be used as the temperature measurement device, and a measurement space resolving power decreases. Further, in a case where the infrared camera with a super wide-angle is not used, the measurement range must be divided into a plurality of measurement ranges, and a plurality of temperature measurement devices which perform the temperature measurement on each of the divided measurement ranges respectively must be provided. Thereby, incurring an increase of a manufacturing cost.

SUMMARY OF THE INVENTION

It is an object of the present invention to provide a surveying instrument which can add a highly accurate temperature information with respect to a positional information of a measuring point.

To attain the object as described above, a surveying instrument according to the present invention comprises: a light projecting optical system for projecting a distance measuring light to a predetermined measuring point, a light receiving optical system for receiving a reflected distance measuring light from the measuring point and an infrared light from the measuring point, a frame which horizontally rotates around a horizontal rotation shaft by a horizontal rotation motor, a vertical rotating unit which is provided in the frame, vertically rotating around a vertical rotation shaft by a vertical rotation motor, projecting the distance measuring light from the light projecting optical system to the measuring point and making the reflected distance measuring light from the measuring point enter the light receiving optical system, a horizontal angle detector for detecting a horizontal angle of the frame, a vertical angle detector for detecting a vertical angle of the vertical rotating unit, and an arithmetic control module for controlling a distance measurement, a temperature measurement, a rotation of the frame and a rotation of the vertical rotating unit based on light receiving results of the reflected distance measuring light and the infrared light, wherein the light receiving optical system has a photodetector for receiving the reflected distance measuring light, an infrared light separating optical component provided on an optical path of the reflected distance measuring light for separating the infrared light from the reflected distance measuring light, and a temperature sensor for receiving the separated infrared light, wherein the arithmetic control module measures a distance to the measuring point based on light receiving results of the reflected distance measuring light received by the photodetector, and measures a temperature of the measuring point based on light receiving results of the infrared light received by the temperature sensor.

Further, in the surveying instrument according to a preferred embodiment, the light receiving optical system has a light receiving lens for making the photodetector to receive the reflected distance measuring light, and the light receiving lens is arranged on an object side away from the infrared light separating optical component.

Further, in the surveying instrument according to a preferred embodiment, the vertical rotating unit is a scanning mirror for reflecting the distance measuring light from the light projecting optical system and projecting toward the measuring point, and for reflecting the reflected distance measuring light to the light receiving optical system, wherein the arithmetic control module makes the distance measuring light to be scanned by the rotation of the scanning mirror.

Further, in the surveying instrument according to a preferred embodiment, the vertical rotating unit is a telescope unit which has a sighting optical system for sighting the measuring point.

Further, in the surveying instrument according to a preferred embodiment, the infrared light separating optical component has an optical characteristic to reflect one of the reflected distance measuring light or the infrared light and to transmit through an other.

Further, in the surveying instrument according to a preferred embodiment, the vertical rotating unit is a reflection mirror having two reflection surfaces and having a function of the infrared light separating optical component, wherein the photodetector and the temperature sensor are arranged at symmetrical positions interposing the reflection mirror, and wherein the reflection mirror reflects the reflected distance measuring light on one surface and reflects the infrared light on an other surface.

Furthermore, the surveying instrument according to a preferred embodiment further comprising an image pickup unit provided coaxially with the light receiving optical system and acquires an image based on a visible light which entered coaxially with the reflected distance measuring light.

According to the present invention, the surveying instrument comprises: a light projecting optical system for projecting a distance measuring light to a predetermined measuring point, a light receiving optical system for receiving a reflected distance measuring light from the measuring point and an infrared light from the measuring point, a frame which horizontally rotates around a horizontal rotation shaft by a horizontal rotation motor, a vertical rotating unit which is provided in the frame, vertically rotating around a vertical rotation shaft by a vertical rotation motor, projecting the distance measuring light from the light projecting optical system to the measuring point and making the reflected distance measuring light from the measuring point enter the light receiving optical system, a horizontal angle detector for detecting a horizontal angle of the frame, a vertical angle detector for detecting a vertical angle of the vertical rotating unit, and an arithmetic control module for controlling a distance measurement, a temperature measurement, a rotation of the frame and a rotation of the vertical rotating unit based on light receiving results of the reflected distance measuring light and the infrared light, wherein the light receiving optical system has a photodetector for receiving the reflected distance measuring light, an infrared light separating optical component provided on an optical path of the reflected distance measuring light for separating the infrared light from the reflected distance measuring light, and a temperature sensor for receiving the separated infrared light, wherein the arithmetic control module measures a distance to the measuring point based on light receiving results of the reflected distance measuring light received by the photodetector, and measures a temperature of the measuring point based on light receiving results of the infrared light received by the temperature sensor. As a result, a temperature of the measuring point irradiated by the distance measuring light can be measured, and the highly accurate temperature information can be added with respect to the positional information of the measuring point.

DETAILED DESCRIPTION OF THE PREFERRED EMBODIMENT

A description will be given below on an embodiment of the present invention by referring to the attached drawings.

Figure 1:
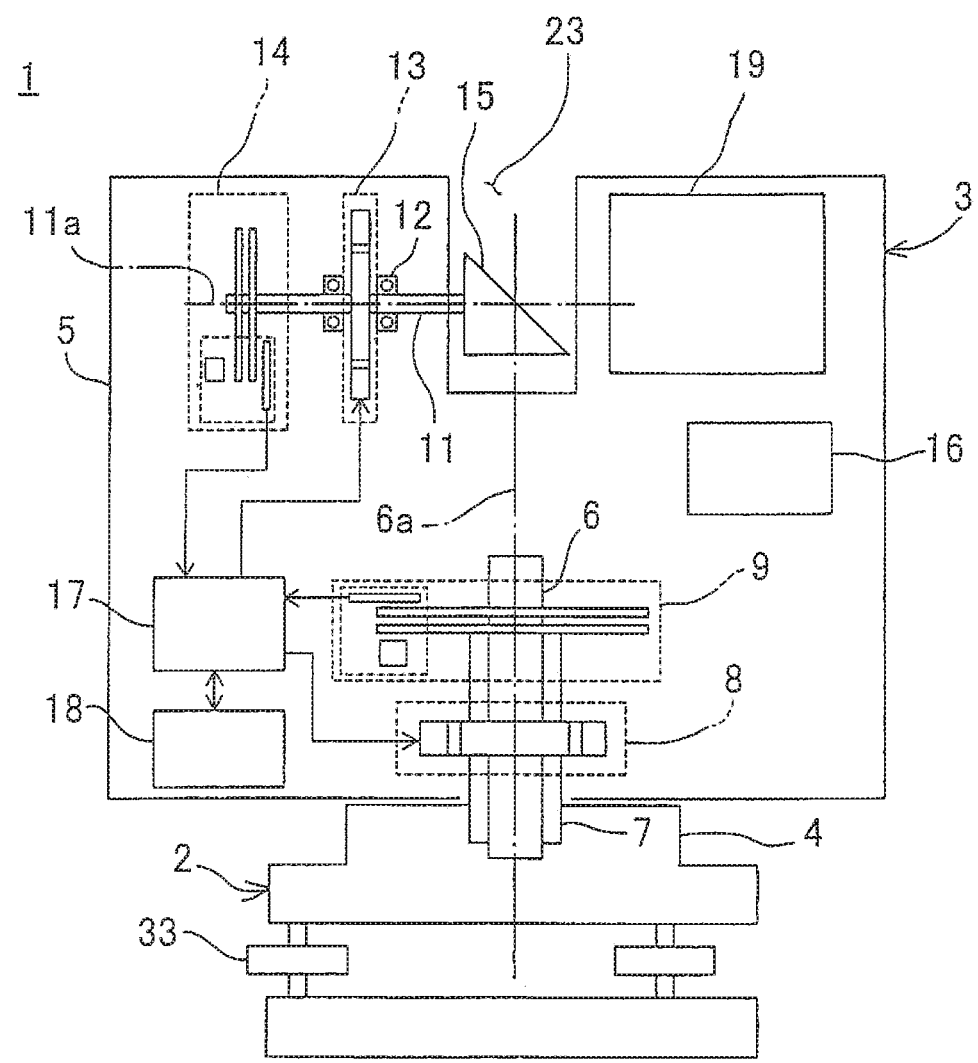
FIG. 1 is a frontal cross-sectional view showing a laser scanner according to a first embodiment of the present invention.

First, by referring to FIG. 1, a description will be given on a surveying instrument according to an embodiment of the present invention. It is to be noted that a description will be given below on a laser scanner as a surveying instrument.

A laser scanner 1 is constituted of a leveling unit 2 mounted on a tripod (not shown) and a scanner main body 3 mounted on the leveling unit 2.

The leveling unit 2 has leveling screws 33, and a leveling of the scanner main body 3 is performed by the leveling screws 33.

The scanner main body 3 comprises a fixed portion 4, a frame 5, a horizontal rotation shaft 6, a horizontal rotation bearing 7, a horizontal rotation motor 8 as a horizontal rotation driving unit, a horizontal angle encoder 9 as a horizontal angle detector, a vertical rotation shaft 11, a vertical rotation bearing 12, a vertical rotation motor 13 as a vertical rotation driving unit, a vertical angle encoder 14 as a vertical angle detector, a scanning mirror 15 which is a vertical rotating unit, an operation panel 16 which functions as both an operation unit and a display unit, an arithmetic control module 17, a storage module 18, and an optical unit 19 which has a distance measuring component and an image pickup unit and the like, and the like.

The horizontal rotation bearing 7 is fixed to the fixed portion 4. The horizontal rotation shaft 6 has a vertical axis 6a, and the horizontal rotation shaft 6 is rotatably supported by the horizontal rotation bearing 7. Further, the frame 5 supported by the horizontal rotation shaft 6, and the frame 5 is configured so as to rotate integrally with the horizontal rotation shaft 6 in a horizontal direction.

Between the horizontal rotation bearing 7 and the frame 5, the horizontal rotation motor 8 is provided, and the horizontal rotation motor 8 is controlled by the arithmetic control module 17. The arithmetic control module 17 rotates the frame 5 around the axis 6a as a center, by the horizontal rotation motor 8.

A relative rotation angle of the frame 5 with respect to the fixed portion 4 is detected by the horizontal angle encoder 9. A detection result detected by the horizontal angle encoder 9 is input to the arithmetic control module 17, and horizontal angle data is calculated by the arithmetic control module 17. The arithmetic control module 17 performs a feedback-control with respect to the horizontal rotation motor 8 based on the horizontal angle data.

Further, in the frame 5, the vertical rotation shaft 11 having a horizontal axis 11a is provided. The vertical rotation shaft 11 is freely rotatable via the vertical rotation bearing 12. It is to be noted that an intersection point between the axis 6a and the axis 11a is a projecting position of a distance measuring light, and also an origin point of a coordinate system of the scanner main body 3.

On the frame 5, a recessed portion 23 is formed. The vertical rotation shaft 11 has one end portion extending into the recessed portion 23, the scanning mirror 15 is fixed to the one end portion, and the scanning mirror 15 is accommodated in the recessed portion 23. Further, on an other end portion of the vertical rotation shaft 11, the vertical angle encoder 14 is provided.

The vertical rotation motor 13 is provided on the vertical rotation shaft 11, and the vertical rotation motor 13 is controlled by the arithmetic control module 17. The arithmetic control module 17 rotates the vertical rotation shaft 11 by the vertical rotation motor 13, and the scanning mirror 15 is rotated around the axis 11a as a center.

A rotation angle of the scanning mirror 15 is detected by the vertical angle encoder 14, and a detection result is input to the arithmetic control module 17. The arithmetic control module 17 calculates vertical angle data of the scanning mirror 15 based on the detection result of the vertical angle encoder 14, and performs a feedback-control with respect to the vertical rotation motor 13 based on the vertical angle data.

Further, the horizontal angle data, the vertical angle data, the distance measurement results, a temperature information (to be described later) and a color information (to be described later), calculated by the arithmetic control module 17, are stored in the storage module 18. In the storage module 18, various types of programs are stored. These programs include: a program for performing a distance measurement and an angle measurement of a measuring point, a program for driving the horizontal rotation motor 8 or the vertical rotation motor 13, a program for acquiring the temperature information, a program for acquiring the color information, a program for adding the temperature information and the color information to the positional information of the measuring point, and other programs. The arithmetic control module 17 executes various types of processing according to the present embodiment based on each of the respective programs stored in the storage module 18.

As the storage module 18, various types of storage means such as an HDD, a CD, a memory card and the like are used. The storage module 18 may be attachable or detachable with respect to the frame 5, or may be capable of sending data to an external storage device or an external data processing device via communication means (not shown).

The operation panel 16 is, for instance, a touch panel, and functions as both an operation unit which gives a distance measurement instruction or changes a measuring condition such as a measuring point interval, or the like, and a display unit which displays a distance measurement result, a temperature measurement result and the like.

Figure 2:
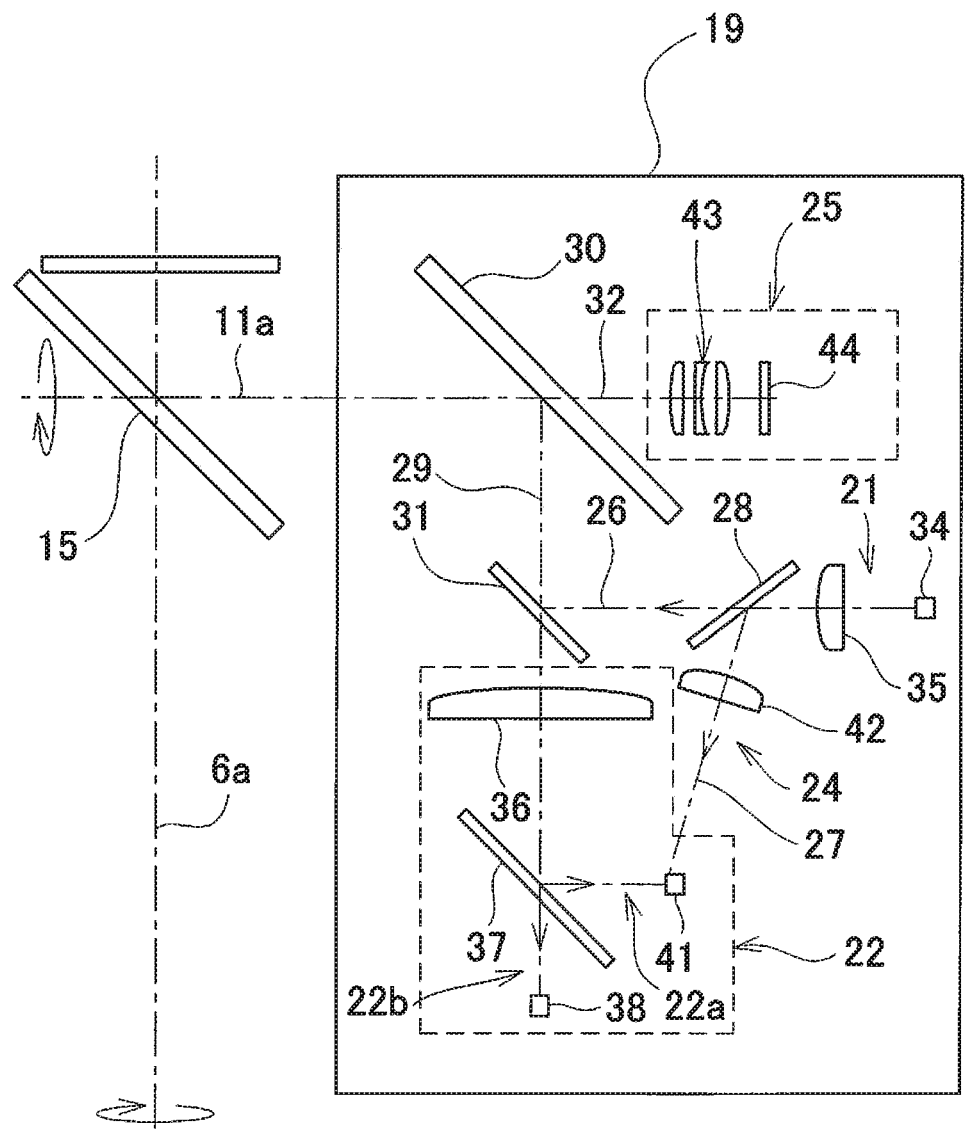
FIG. 2 is a schematical drawing showing an optical system of an optical unit of the laser scanner.

Next, referring to FIG. 2, a description will be given on the optical unit 19.

The optical unit 19 has a light projecting optical system 21 which projects a distance measuring light, a light receiving optical system 22 which receives a reflected distance measuring light reflected by an object to be measured, an internal reference light optical system 24 which divides one part of the distance measuring light projected from the light projecting optical system 21 to the light receiving optical system 22, and an image pickup unit 25.

Further, the optical unit 19 has a first beam splitter 28 arranged at an intersecting position of a projection optical axis 26 of the light projecting optical system 21 and an internal reference optical axis 27 of the internal reference light optical system 24, a second beam splitter 31 arranged at an intersecting position of the projection optical axis 26 and a light receiving optical axis 29 of the light receiving optical system 22, and a first dichroic mirror 30 arranged at an intersecting position of the light receiving optical axis 29 and an image pickup optical axis 32 of the image pickup unit 25.

The first beam splitter 28 has an optical characteristic to reflect one part of a distance measuring light as an internal reference light and to transmit through a remaining part as a distance measuring light. Further, the second beam splitter 31 has an optical characteristic to reflect a distance measuring light and to transmit through a reflected distance measuring light. Further, the first dichroic mirror 30 has an optical characteristic to reflect a distance measuring light and a reflected distance measuring light and to transmit through a visible light. It is to be noted that a beam splitter may be used in place of the first dichroic mirror 30.

The light projecting optical system 21 has a light emitting element 34 provided on the projection optical axis 26, and a projection lens 35. The light emitting element 34 is, for instance, a laser diode (LD), and performs a pulsed light emission or a burst light emission (an intermittent light emission) of a laser beam as a distance measuring light, which includes a near-infrared light of 700 nm to 1600 nm and the visible light.

The light receiving optical system 22 is an optical system in which a distance measuring light receiving optical system 22a for measuring a distance to a measuring point and an infrared light receiving optical system 22b for measuring a temperature of the measuring point are integrated. The infrared light receiving optical system 22b has a light receiving lens 36 provided on the light receiving optical axis 29, a second dichroic mirror 37, and a temperature sensor (an infrared photodetector) 38. The distance measuring light receiving optical system 22a has a photodetector 41 which is provided on a reflection optical axis of the second dichroic mirror 37 and also provided at an intersecting position of the reflection optical axis of the second dichroic mirror 37 and the internal reference optical axis 27.

The second dichroic mirror 37 is an infrared light separating optical component which separates a reflected distance measuring light and an infrared light, and has an optical characteristic to transmit through an infrared light and to reflect a reflected distance measuring light. It is to be noted that a beam splitter may be used in place of the second dichroic mirror 37. The temperature sensor 38 is an infrared photodetector which has a size corresponding to one pixel and has a sensitivity of 3 μm to 15 μm, for instance. Since the temperature sensor 38 is an infrared temperature sensor, a temperature of a measuring point can be measured based on a relationship between a radiant energy and a temperature of the object to be measured.

The internal reference light optical system 24 has the first beam splitter 28, a light receiving lens 42 and the photodetector 41. The photodetector 41 is shared by the light receiving optical system 22 and the internal reference light optical system 24, and configured so as to receive the distance measuring light reflected by the first beam splitter 28 and the reflected distance measuring light.

The image pickup unit 25 has an image pickup lens 43 constituted of a plurality of lenses and an image pickup element 44. The image pickup element 44 is for outputting a digital image signal and is constituted of an aggregation of pixels, such as a CCD or a CMOS and the like, for instance, and configured so that a position of each pixel in the image pickup element 44 can be specified.

A description will be given on a case where the distance measurement and the temperature measurement are performed by the laser scanner 1.

The distance measuring light which is a pulsed light or a burst light is emitted from the light emitting element 34. One part of the distance measuring light is reflected by the first beam splitter 28 and enters the photodetector 41. A remaining part of the distance measuring light transmits through the first beam splitter 28.

The distance measuring light transmitted through the first beam splitter 28 is sequentially reflected by the second beam splitter 31 and the first dichroic mirror 30 and enters the scanning mirror 15. An optical axis of the distance measuring light which entered the scanning mirror 15 is coincident with the axis 11a, and the distance measuring light is deflected at a right angle by the scanning mirror 15. By the scanning mirror 15 rotating around the axis 11a as the center, the distance measuring light becomes orthogonal to the axis 11a and is rotated (scanned) within a plane including the axis 6a. The distance measuring light reflected by the scanning mirror 15 is projected to a predetermined measuring point (an irradiating point) of the object to be measured, and the object to be measured is scanned.

The distance measuring light reflected at the measuring point (referred to as a "reflected distance measuring light" hereinafter) enters the scanning mirror 15, and is reflected at a right angle by the scanning mirror 15. The reflected distance measuring light reflected by the scanning mirror 15 enters the first dichroic mirror 30, and is further reflected. Further, a visible light such as an external light and the like which entered the scanning mirror 15 coaxially with the reflected distance measuring light is transmitted through the first dichroic mirror 30, and received by the image pickup element 44. Further, the infrared light which entered the scanning mirror 15 coaxially with the reflected distance measuring light is reflected by the first dichroic mirror 30.

The reflected distance measuring light and the infrared light reflected by the first dichroic mirror 30 are transmitted through the second beam splitter 31, and enter the second dichroic mirror 37 via the light receiving lens 36. The second dichroic mirror 37 reflects the near-infrared light and transmits through the infrared light. Therefore, the reflected distance measuring light reflected by the second dichroic mirror 37 enters the photodetector 41. Further, the infrared light transmitted through the second dichroic mirror 37 enters the temperature sensor 38. Therefore, the light receiving optical axis 29 becomes an optical path for the reflected distance measuring light, and the second dichroic mirror 37 is arranged on the optical path of the reflected distance measuring light.

The arithmetic control module 17 executes a distance measurement for each one pulse of the distance measuring light (Time of Flight) based on a time difference (that is, a reciprocating time of the pulsed light) and a light velocity, between a light emission timing of the light emitting element 34 and a light receiving timing of the reflected distance measuring light of the photodetector 41. The arithmetic control module 17 can change the timing of the light emission, that is, a pulse interval, of the light emitting element 34.

It is to be noted that, in the present embodiment, the internal reference light optical system 24 is provided, and by performing a distance measurement based on a time difference between a light receiving timing of an internal reference light received by the photodetector 41, the light receiving timing of the reflected distance measuring light, and a light velocity, a distance measurement with higher accuracy can be accomplished.

Further, the arithmetic control module 17 measures a temperature of the measuring point based on a radiant energy amount of the infrared light which has entered the temperature sensor 38. Further, the arithmetic control module 17 acquires an image of the object to be measured with the measuring point as a center, based on the reflected distance measuring light in a visible region which has entered the image pickup element 44.

Here, the infrared light received by the temperature sensor 38 and the reflected distance measuring light received by the photodetector 41 are separated by the second dichroic mirror 37, and are coaxial with each other. Therefore, based on the light receiving results of the temperature sensor 38 and the photodetector 41, distance data and temperature data of the measuring point can be acquired at the same time. The acquired distance data and temperature data are associated with each other and stored in the storage module 18.

Further, the reflected distance measuring light which enters the light receiving optical system 22 and the visible light which enters the image pickup element 44 are separated by the first dichroic mirror 30, and are coaxial with each other. Therefore, in the image pickup unit 25, an image with the measuring point as a center can be acquired. That is, a color information of the measuring point can be acquired at the same time. The acquired color information is associated with the distance data and the temperature data and stored in the storage module 18.

Further, in a case where the frame 5 and the scanning mirror 15 are each rotated at a constant speed respectively, by cooperative operation of the rotation of the scanning mirror 15 in the vertical direction and the rotating of the frame 5 in the horizontal direction, the distance measuring light is scanned two-dimensionally. Further, by the distance measurement for each pulsed light, distance measurement data (a slope distance) is acquired. Further, by detecting the vertical angle and the horizontal angle by the vertical angle encoder 14 and the horizontal angle encoder 9 per each pulsed light, the vertical angle data and the horizontal angle data can be acquired. By the vertical angle data, the horizontal angle data, and the distance measurement data, three-dimensional point cloud data (a positional information) corresponding to the object to be measured can be acquired.

As described above, in the first embodiment, the temperature sensor 38 is provided in the light receiving optical system 22, and the temperature sensor 38 is coaxial with the photodetector 41. Therefore, there is no need to provide the temperature sensor 38 additionally, and the laser scanner 1 can be miniaturized.

Further, in the infrared light receiving optical system 22b, the light receiving lens 36 which is shared by the distance measuring light receiving optical system 22a is provided, and since it is configured so that the infrared light enters the temperature sensor 38 via the light receiving lens 36, a diameter of the light receiving lens 36 can be increased. Therefore, a light receiving amount of the infrared light which enters the temperature sensor 38 can be increased, and a distance range where a temperature can be measured can be expanded.

Further, since the infrared light and the reflected distance measuring light are received coaxially by the temperature sensor 38 and the photodetector 41, a distance measurement information and an angle measurement information (a positional information) and a temperature information regarding the same measuring point can be acquired at the same time. Therefore, the temperature information can be highly accurately added to the three-dimensional point cloud data acquired by the laser scanner 1.

Further, since the reflected distance measuring light and the visible light are received coaxially by the photodetector 41 and the image pickup element 44, the distance measurement information and the angle measurement information (the positional information) and the color information regarding the same measuring point can be acquired at the same time. Therefore, the color information can be highly accurately added to the three-dimensional point cloud data acquired by the laser scanner 1.

Further, as the temperature sensor 38, a multi-spectral dispersing type infrared sensor which uses two or more wavelengths in an infrared wavelength range may be used. By using the infrared sensor, even in a case where an emissivity of an object is unknown, an accurate temperature measurement can be performed.

Further, in the first embodiment, since a temperature of the measuring point is measured based on the infrared light radiated from the measuring point, based on a difference between the temperatures acquired at the respective measuring points, it can be applied to specify or repair a heat source spot or a water leak spot of a measured building. Further, in a measurement of a piping, it can be applied to confirm, or the like, whether or not a gas or a liquid is flowing through the piping.

Figure 3:
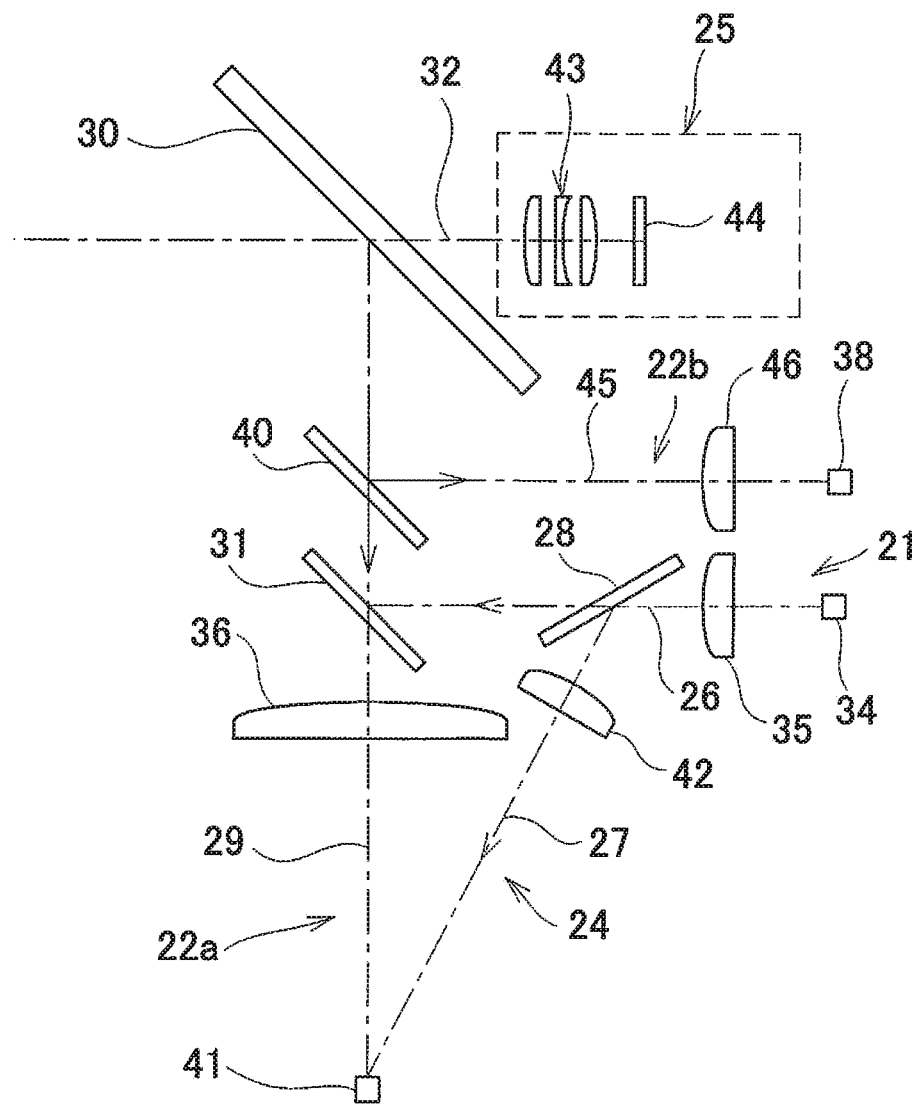
FIG. 3 is a schematical drawing showing an optical system of an optical unit of a laser scanner according to a second embodiment of the present invention.

Next, referring to FIG. 3, a description will be given on a second embodiment of the present invention. It is to be noted that in FIG. 3, the same components as shown in FIG. 2 are referred by the same symbols, and a detailed description thereof will be omitted. It is to be noted that FIG. 3 shows an optical unit 19 in the second embodiment, and other structures are configured to be the same as the structures in the first embodiment.

In the second embodiment, a first beam splitter 28 is arranged at an intersecting position of a projection optical axis 26 and an internal reference optical axis 27, a second beam splitter 31 is arranged at an intersecting position of the projection optical axis 26 and a light receiving optical axis 29, a first dichroic mirror 30 is arranged at an intersecting position of the light receiving optical axis 29 and an image pickup optical axis 32, and a third dichroic mirror 40 as an infrared light separating optical component is arranged at an intersecting position of the light receiving optical axis 29 and an infrared light receiving optical axis 45 of an infrared light receiving optical system 22b.

On the light receiving optical axis 29, the first dichroic mirror 30, the third dichroic mirror 40, the second beam splitter 31 and a light receiving lens 36 are provided sequentially from a projection side.

Further, on the infrared light receiving optical axis 45, the third dichroic mirror 40, an infrared light receiving lens 46 and a temperature sensor 38 are provided sequentially from a projection side. The third dichroic mirror 40 has, for instance, an optical characteristic to reflect the infrared light and to transmit through a distance measuring light.

When performing a distance measurement and a temperature measurement by a laser scanner 1 (see FIG. 1), one part of the distance measuring light emitted by a pulsed light emission or a burst light emission from a light emitting element 34 is reflected by the first beam splitter 28 as an internal reference light, and a remaining part is transmitted through the first beam splitter 28 as the distance measuring light. The distance measuring light transmitted through the first beam splitter 28 is reflected by the second beam splitter 31, transmitted through the third dichroic mirror 40, reflected by the first dichroic mirror 30, enters a scanning mirror 15 (see FIG. 2), and projected to a measuring point.

After the reflected distance measuring light reflected at the measuring point is reflected by the reflection mirror 15, a visible light is separated by the first dichroic mirror 30. That is, the visible light which entered coaxially with the reflected distance measuring light is transmitted through the first dichroic mirror 30 and received by the image pickup element 44, and an image with the measuring point as a center is acquired. Further, the reflected distance measuring light and the infrared light which entered coaxially with the reflected distance measuring light are reflected by the first dichroic mirror 30.

The reflected distance measuring light and the infrared light reflected by the first dichroic mirror 30 are separated into an infrared light and a near-infrared light by the third dichroic mirror 40. That is, the infrared light is reflected by the third dichroic mirror 40 and received by the temperature sensor 38 through the infrared light receiving lens 46, and a temperature information of the measuring point is acquired. Further, the reflected distance measuring light is transmitted through the third dichroic mirror 40, and after being transmitted through the second beam splitter 31, is received by the photodetector 41 via the light receiving lens 36, and distance measurement data of the measuring point is acquired.

In the second embodiment, likewise, the infrared light which has entered coaxially with the reflected distance measuring light is separated by the third dichroic mirror 40 arranged on an optical path of the reflected distance measuring light, and the infrared light and the reflected distance measuring light are configured to be received by the temperature sensor 38 and the photodetector 41, respectively. That is, the infrared light and the reflected distance measuring light are coaxially received by the temperature sensor 38 and the photodetector 41. Therefore, a distance measurement information and an angle measurement information (a positional information) and a temperature information regarding the same measuring point can be acquired at the same time, and the temperature information can be highly accurately added to three-dimensional point cloud data acquired by the laser scanner 1.

Further, in the image pickup element 44, likewise, since the visible light which has entered coaxially with the reflected distance measuring light is received by the first dichroic mirror 30 arranged on the optical path of the reflected distance measuring light, a color information of the measuring point where the distance measurement and the angle measurement have been performed can be acquired at the same time. Therefore, the color information can be highly accurately added to the three-dimensional point cloud data acquired by the laser scanner 1.

Figure 4:
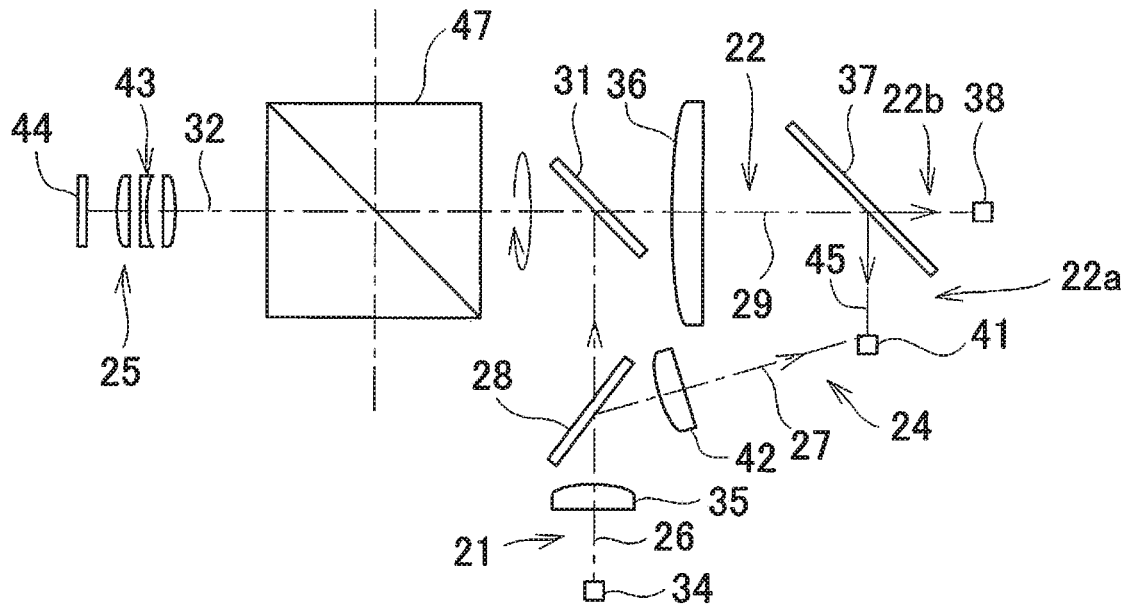
FIG. 4 is a schematical drawing showing an optical system of an optical unit of a laser scanner according to a third embodiment of the present invention.

Next, referring to FIG. 4, a description will be given on a third embodiment of the present invention. It is to be noted that in FIG. 4, the same components as shown in FIG. 2 are referred by the same symbols, and a detailed description thereof will be omitted.

In the third embodiment, as a vertical rotating unit (a scanning mirror) for rotatably irradiating a distance measuring light, a prism 47 which has two reflection surfaces, front and rear surfaces, is adopted. Further, an image pickup unit 25 is independently provided at a position symmetrical with a light receiving optical system 22, interposing the prism 47. A light receiving optical axis 29 and an image pickup optical axis 32 are coaxial with each other. Regarding other structures, the structures are substantially the same as the optical unit 19 of the first embodiment.

In the third embodiment, the reflection surface which reflects the reflected distance measuring light and the infrared light, and the reflection surface which reflects the visible light are different reflection surfaces. Therefore, the reflected distance measuring light and the infrared light are reflected in a direction which is 180° different from a direction in which the visible light is reflected.

Therefore, a center of an image acquired by the image pickup unit 25 is a point different from the measuring point in which the distance measurement and the temperature measurement have been performed based on the infrared light received by the temperature sensor 38 and the reflected distance measuring light received by the photodetector 41. However, since the prism 47 is rotated constantly at a known speed, based on the rotating speed of the prism 47 or based on an angle detection result of the vertical angle encoder 14 (see FIG. 1), by acquiring the distance measurement results and the images at the positions which are 180° different, the measuring point and the center of the image can be easily coincided.

In the third embodiment, likewise, the infrared light and the reflected distance measuring light are coaxially received by the temperature sensor 38 and the photodetector 41. Therefore, a distance measurement information and an angle measurement information (a positional information) and a temperature information regarding the same measuring point can be acquired at the same time, and the temperature information can be highly accurately added to three-dimensional point cloud data acquired by the laser scanner 1 (see FIG. 1).

Further, since the measuring point can be easily coincided with the center of the image, the color information can be highly accurately added to the point cloud data.

Further, the image pickup unit 25 is provided at a position symmetrical with the light receiving optical system 22, interposing the prism 47. Therefore, it is not necessary to provide a first dichroic mirror 30 which has a wavelength selecting optical characteristic for separating the visible light from the reflected distance measuring light and a simple reflection mirror will suffice, and hence an optical system can be manufactured at a low price.

It is to be noted that, in the third embodiment, although the prism 47 has two reflection surfaces which totally reflect all the lights, a wavelength selective film may also be provided on each reflection surface. For instance, a reflective film which has a wavelength characteristic of reflecting the reflected distance measuring light and the visible light may be provided on one reflection surface, and a reflective film which has a wavelength characteristic of reflecting only the infrared light may be provided on an other reflection surface.

Figure 5:
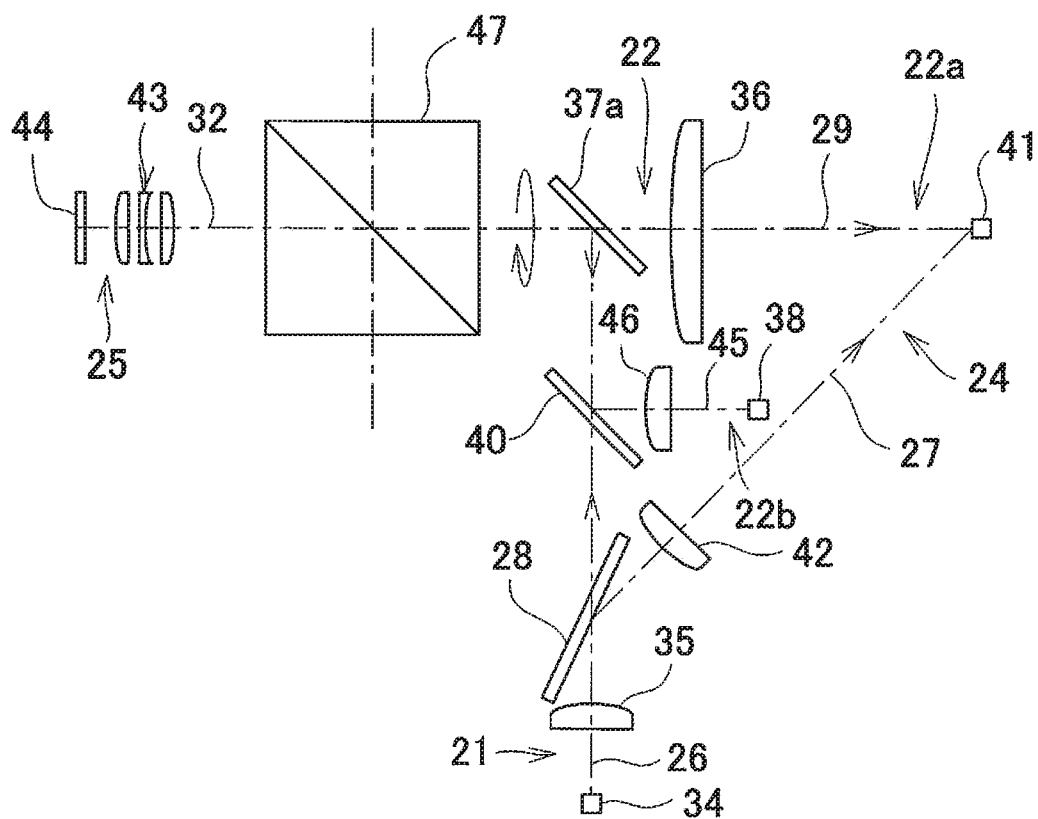
FIG. 5 is a schematical drawing showing a modified example of the optical system of the optical unit of the laser scanner according to the third embodiment of the present invention.

FIG. 5 shows a modified example of the third embodiment.

In the modified example, a second dichroic mirror 37*a* as an infrared light separating optical component is arranged on a measuring point side away from a light receiving lens 36, and a third dichroic mirror 40 is arranged at an intersecting position of the light receiving optical axis 29 and the infrared light receiving optical axis 45. The second dichroic mirror 37*a* has, for instance, an optical characteristic for reflecting the infrared light. The third dichroic mirror 40 has, for instance, an optical characteristic for reflecting the infrared light and for transmitting through the distance measuring light. It is to be noted that a beam splitter may be used in place of the second dichroic mirror 37*a* or the third dichroic mirror 40.

In the modified example, the infrared light reflected by the second dichroic mirror 37*a* and the third dichroic mirror 40 is received by the temperature sensor 38 via an infrared light receiving lens 46. Other structures are configured to be the same as the structures in the third embodiment.

Figure 6A:
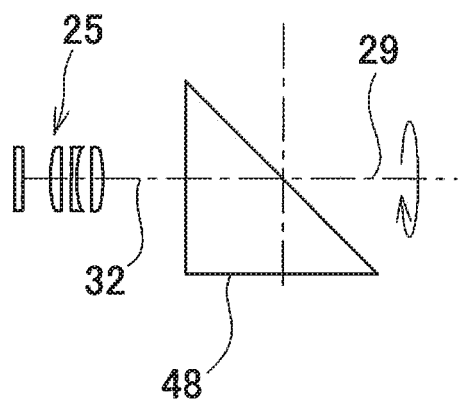
FIG. 6A, FIG. 6B, FIG. 6C and FIG. 6D are schematical drawings showing a modified example of a vertical rotating unit in the laser scanner according to the third embodiment of the present invention.
Figure 6B:
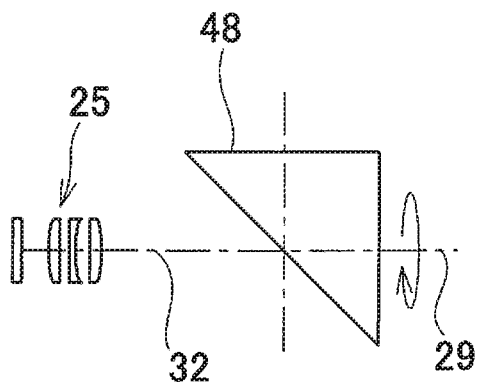

It is to be noted that, in the third embodiment and the modified example of the third embodiment, although the prism 47 having two reflection surfaces is used as the vertical rotating unit, any other optical component may be used. For instance, as shown in FIG. 6A and FIG. 6B, a triangular prism 48 may be used as the vertical rotating unit.

Figure 6C:
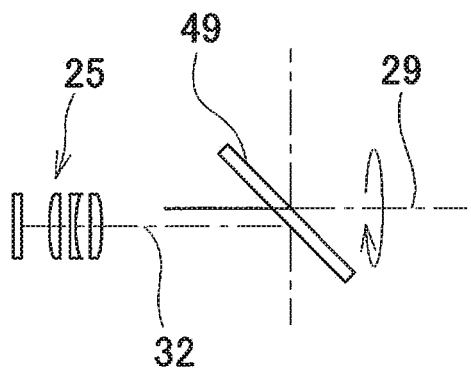
Figure 6D:
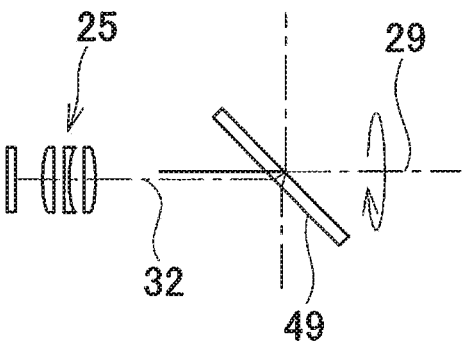

Alternatively, as shown in FIG. 6C, a plate 49 having two reflection surfaces, front and rear surfaces, may be used as the vertical rotating unit. Further, as shown in FIG. 6D, the two reflection surfaces may be provided on one surface of the plate 49 so that the visible light and the reflected distance measuring light can be reflected by two reflection surfaces, the front and rear surfaces.

It is to be noted that, in a case where the plate 49 is used, a deviation occurs with respect to a reflecting position of the reflected distance measuring light and the visible light by an amount corresponding to a thickness of the plate 49 or a refraction in the plate 49. Therefore, it is desirable to displace the image pickup unit 25 by an amount corresponding to the deviation between the reflecting positions.

Figure 7:
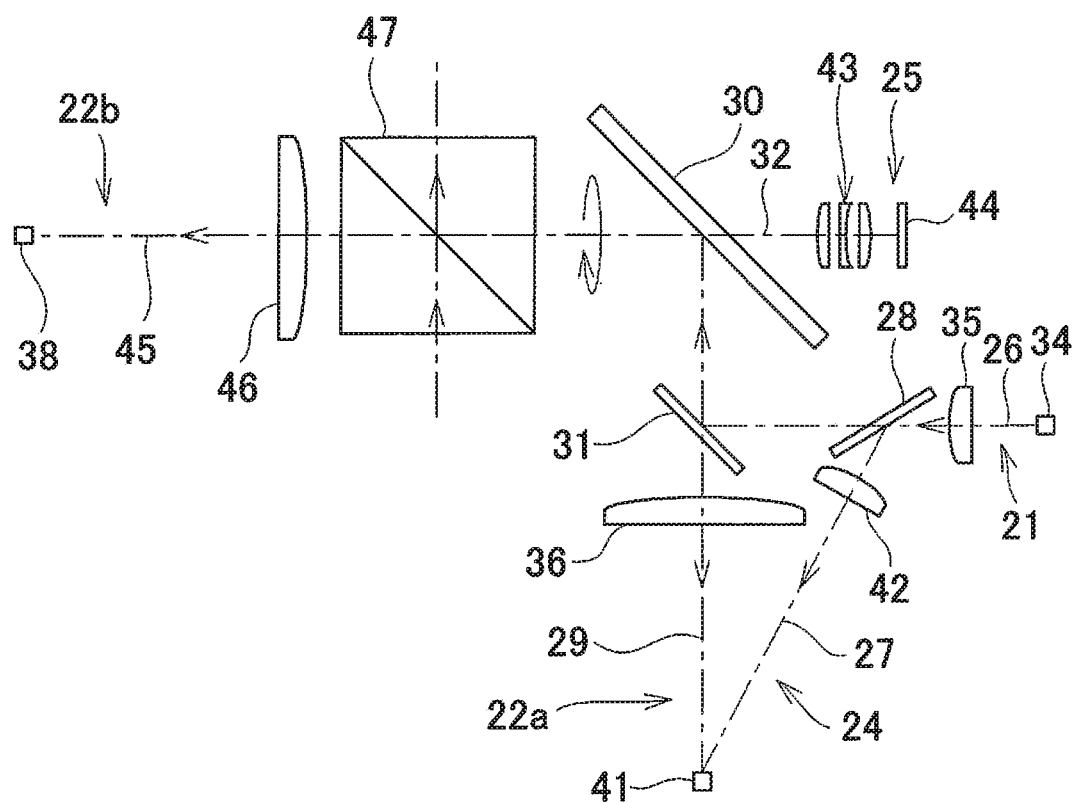
FIG. 7 is a schematical drawing showing an optical system of an optical unit of a laser scanner according to a fourth embodiment of the present invention.

Next, referring to FIG. 7, a description will be given on a fourth embodiment of the present invention. It is to be noted that in FIG. 7, the same components as shown in FIG. 2 and FIG. 5 are referred by the same symbols, and a description thereof will be omitted.

In the fourth embodiment, an infrared light receiving optical system 22*b* is independently provided, and a prism 47 functions as an infrared light separating optical component. The infrared light receiving optical system 22*b* is provided at a position symmetrical with a distance measuring light receiving optical system 22*a*, interposing the prism 47, and an infrared light receiving optical axis 45 and a light receiving optical axis 29 are coaxial. Therefore, the infrared light from an object to be measured and the reflected distance measuring light from a measuring point are reflected by the prism 47 in directions which are 180° different from each other.

For this reason, a point where a temperature measurement has been performed based on the infrared light received by a temperature sensor 38 and a measuring point where a distance measurement has been performed based on the reflected distance measuring light received by a photodetector 41 become difficult points. However, since the prism 47 is constantly rotated at a known speed, a point in which the temperature measurement has been performed can be easily coincided with the measuring point based on the rotating speed of the prism 47 or a vertical angle detected by a vertical angle encoder 14 (see FIG. 1).

It is to be noted that the prism 47 is simply a reflection mirror, and totally reflects lights from the measuring point. However, since the temperature sensor 38 has a sensitivity to an infrared light alone and the photodetector 41 has a sensitivity to a distance measuring light (a near-infrared light) alone, the reflected distance measuring light and the infrared light from the measuring point are in a substantially separated condition by the prism 47.

Therefore, a highly accurate temperature information can be added to three-dimensional point cloud data measured by a laser scanner 1.

Further, since the light receiving optical axis 29 and an image pickup optical axis 32 are coaxial, an image pickup unit 25 can acquire an image with a measuring point as a center at the same time, and a highly accurate color information can be added to the point cloud data.

Further, since the infrared light receiving optical system 22*b* is provided independently, the prism 47 also has a function as a second dichroic mirror 37. Therefore, the second dichroic mirror 37 becomes no longer necessary, and an optical system can be manufactured at a low cost.

Further, the second dichroic mirror 37 for separating the infrared light is expensive, and designing the optical system is also difficult. Therefore, by providing the infrared light receiving optical system 22b independently, designing the optical system becomes easy.

Figure 8:
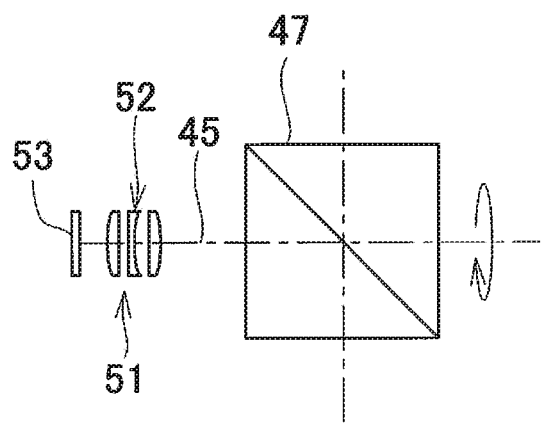
FIG. 8 is a schematical drawing showing a modified example of an infrared light receiving optical system in the optical unit of the laser scanner according to the fourth embodiment of the present invention.

It is to be noted that, in the fourth embodiment, the infrared light receiving optical system 22b is constituted of an infrared light receiving lens 46 and a temperature sensor 38, but as shown in FIG. 8, an infrared camera 51 may also be used as the infrared light receiving optical system 22b.

The infrared camera 51 is constituted of a camera lens 52 made up of a plurality of lenses and a photodetector 53 made up of a two-dimensional area sensor. By using the infrared camera 51, a temperature measurement can be performed in a wide range with an infrared light receiving optical axis 45 at a center. Further, as the infrared camera 51, a spectroscopic infrared sensor which uses two or more wavelengths in an infrared wavelength range may also be used.

Figure 9:
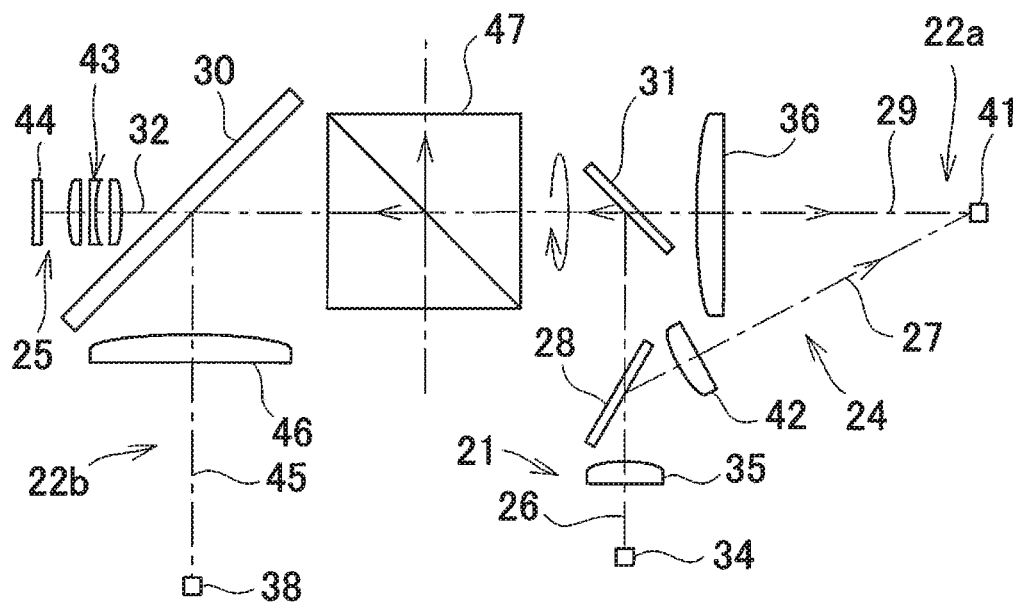
FIG. 9 is a schematical drawing showing an optical system of an optical unit of a laser scanner according to a fifth embodiment of the present invention.

Next, referring to FIG. 9, a description will be given on a fifth embodiment of the present invention. It is to be noted that in FIG. 9, the same components as shown in FIG. 5 are referred by the same symbols, and a description thereof will be omitted.

In the fifth embodiment, interposing a prism 47, a light projecting optical system 21, an internal reference light optical system 24 and a distance measuring light receiving optical system 22a are provided on one side and an infrared light receiving optical system 22b and an image pickup unit 25 are provided on an other side.

Similarly to the fourth embodiment, since the reflected distance measuring light is reflected by a reflection surface of the prism 47 which is different from the infrared light and the visible light, the prism 47 functions as an infrared light separating optical component. Further, since the prism 47 is constantly rotated at a known speed, a point in which the temperature measurement has been performed can be easily coincided with a measuring point based on the rotating speed of the prism 47 or a vertical angle detected by a vertical angle encoder 14 (see FIG. 1).

Therefore, a highly accurate temperature information and color information can be added to three-dimensional point cloud data measured by a laser scanner 1.

Further, since the prism 47 can also function as a second dichroic mirror 37, the second dichroic mirror 37 becomes no longer necessary, and an optical system can be manufactured at a low cost.

It is to be noted that, in the first embodiment to the fifth embodiment, although it is configured so that the distance measurement, the temperature measurement and the image acquisition are performed at the same time, the image pickup unit 25 may be removed, and it may be configured such that only the distance measurement and the temperature measurement are performed.

Figure 10:
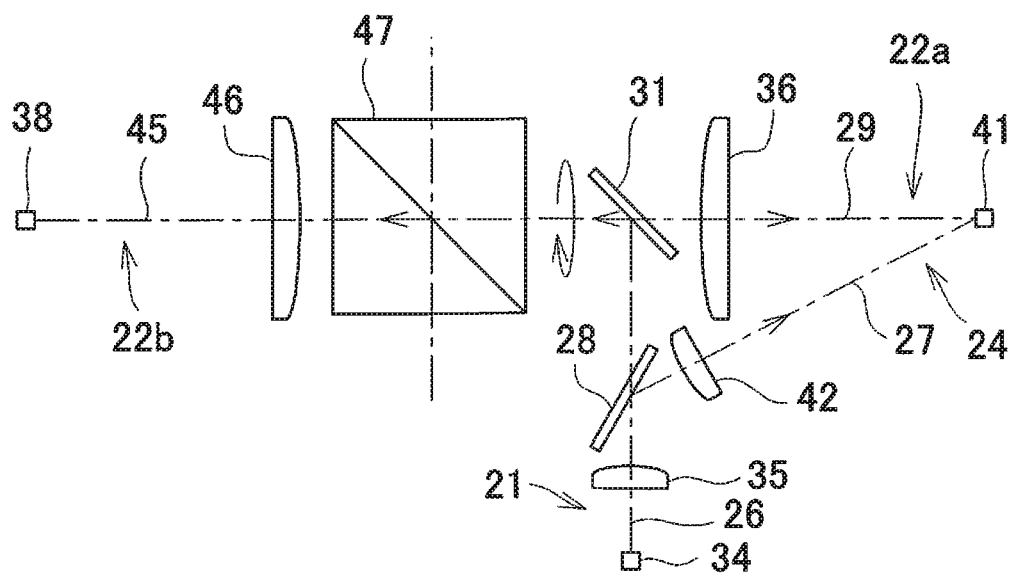
FIG. 10 is a schematical drawing showing a modified example of the optical system of the optical unit of the laser scanner according to the fifth embodiment of the present invention.

For instance, FIG. 10 shows a configuration in which the image pickup unit 25 is removed from the fifth embodiment, but it is needless to say that the image pickup unit 25 can be removed similarly from the first embodiment to the fourth embodiment.

Further, in the first embodiment to the fifth embodiment, a second beam splitter 31 is provided on the optical path of the reflected distance measuring light, but a mirror may be provided in place of the second beam splitter 31. In this case, the reflected distance measuring light which has passed a periphery of the mirror is condensed to a light receiving lens 36.

Next, referring to FIG. 11, a description will be given on a sixth embodiment of the present invention.

In the first embodiment to the fifth embodiment, a laser scanner 1 (see FIG. 1) is used as a surveying instrument, but in the sixth embodiment, a total station is used as the surveying instrument.

Figure 11:
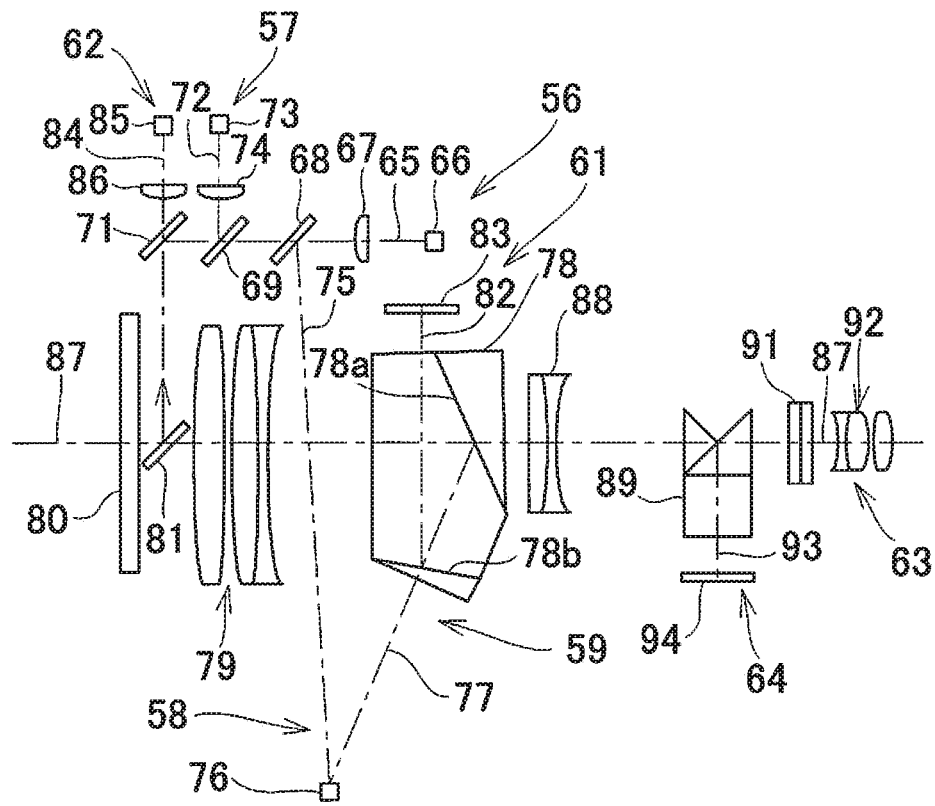
FIG. 11 is a schematical drawing showing an optical system of an optical unit of a total station according to a sixth embodiment of the present invention.

FIG. 11 shows an optical system which is accommodated in a telescope unit which is a vertical rotating unit of the total station. The optical system has a sighting optical axis 87, and a distance measuring light projecting optical system 56. A tracking light projecting optical system 57, an internal reference light optical system 58, a distance measuring light receiving optical system 59, a tracking light receiving optical system 61, an infrared light receiving optical system 62, a sighting optical system 63, and an image pickup unit 64 are provided with respect to the sighting optical axis 87. On the sighting optical axis 87, a mirror 81 as an infrared light separating optical component, an objective lens 79, a dichroic prism 78, a focusing lens 88, a Porro prism 89 with a beam splitter, a reticle 91 and an ocular lens 92 are provided sequentially from an object side. It is to be noted that a reference numeral 80 denotes a glass provided in a transmission window.

The distance measuring light projecting optical system 56 has a projection optical axis 65. A light emitting element 66 which emits a near-infrared light or a distance measuring light of a visible light is provided on the projection optical axis 65, and a projection lens 67, a beam splitter 68, a first dichroic mirror 69 and a second dichroic mirror 71 as an infrared light separating optical component are provided sequentially from the light emitting element 66 side. The projection optical axis 65 is deflected by the second dichroic mirror 71 and enters the mirror 81. Further, the projection optical axis 65 is deflected by the mirror 81 and coincides with the sighting optical axis 87. It is to be noted that the mirror 81 may be a half mirror.

The beam splitter 68 has an optical characteristic to reflect one part of a distance measuring light as an internal reference light and to transmit through a remaining part as the distance measuring light. The first dichroic mirror 69 has an optical characteristic to reflect only a tracking light (to be described later) and to transmit through lights having any other wavelength. The second dichroic mirror 71 has an optical characteristic to transmit through only the infrared light and to reflect lights having any other wavelength.

The tracking light projecting optical system 57 has a tracking optical axis 72, and the tracking optical axis 72 enters the first dichroic mirror 69 and is deflected by the first dichroic mirror 69, and coincides with the projection optical axis 65. A projection lens 74 and a light emitting element 73 which emits a tracking light which is a near-infrared light are provided on the tracking optical axis 72.

The internal reference light optical system 58 has an internal reference optical axis 75, and the internal reference optical axis 75 coincides with the projection optical axis 65 deflected by the beam splitter 68. A photodetector 76 is provided on the internal reference optical axis 75.

The distance measuring light receiving optical system 59 has a light receiving optical axis 77, and the light receiving optical axis 77 coincides with the sighting optical axis 87 deflected by the dichroic prism 78. On the light receiving optical axis 77, the mirror 81, the objective lens 79, the dichroic prism 78 and the photodetector 76 are provided sequentially from the object side.

The dichroic prism 78 has a first reflection surface 78a having an optical characteristic to transmit through only the visible light and to reflect any other lights, and a second reflection surface 78b having an optical characteristic to transmit through the reflected distance measuring light (the near-infrared light) and to reflect the reflected tracking light.

The tracking light receiving optical system 61 has a tracking light receiving optical axis 82, and the tracking light receiving optical axis 82 coincides with the light receiving optical axis 77 branched by the dichroic prism 78. The tracking light receiving optical system 61 has a tracking photodetector 83 provided on the tracking light receiving optical axis 82.

The infrared light receiving optical system 62 has an infrared light receiving optical axis 84, and the infrared light receiving optical axis 84 is branched from the sighting optical axis 87 by the mirror 81. On the infrared light receiving optical axis 84, the mirror 81, the second dichroic mirror 71, an infrared light receiving lens 86 and a temperature sensor 85 are provided sequentially from the object side. It is to be noted that the temperature sensor 85 may be a spectroscopic infrared sensor which uses two or more wavelengths in an infrared wavelength range.

The sighting optical system 63 has the objective lens 79, the dichroic prism 78, the focusing lens 88, the Porro prism 89 with a beam splitter, the reticle 91 and the ocular lens 92, which are provided on the sighting optical axis 87, sequentially from the object side.

Further, the image pickup unit 64 has an image pickup optical axis 93 branched from the sighting optical axis 87 by the Porro prism 89 with a beam splitter, and an image pickup element 94 is provided on the image pickup optical axis 93.

A description will be given of a case where the distance measurement and the temperature measurement are performed by the total station.

After sighting a predetermined measuring point via the sighting optical system 63, the distance measuring light which is the near-infrared light or a visible laser beam is emitted from the light emitting element 66. One part of the distance measuring light is reflected by the beam splitter 68 as the internal reference light, and enters the photodetector 76. A remaining part of the distance measuring light is transmitted through the first dichroic mirror 69, reflected by the second dichroic mirror 71, and after being reflected by the mirror 81, projected to the predetermined measuring point.

The reflected distance measuring light reflected at the measuring point passes the periphery of the mirror 81 and enters the dichroic prism 78 via the objective lens 79. Further, the reflected distance measuring light is reflected by the first reflection surface 78a of the dichroic prism 78, and enters the photodetector 76.

An arithmetic control module (not shown) calculates a distance to the measuring point based on a light receiving signal generated by the photodetector 76, upon receiving the internal reference light and the reflected distance measuring light.

Further, the infrared light emitted from the measuring point on an object to be measured enters the mirror 81 coaxially with the reflected distance measuring light. The infrared light is reflected by the mirror 81, separated from the reflected distance measuring light, and after being transmitted through the second dichroic mirror 71, enters the temperature sensor 85 via the infrared light receiving lens 86. The temperature sensor 85 receives the infrared light and generates a light receiving signal. It is to be noted that one part of the reflected distance measuring light and the visible light are reflected by the mirror 81, but since the second dichroic mirror 71 has an optical characteristic to transmit through only the infrared light, the infrared light alone enters the temperature sensor 85.

The arithmetic control module measures a temperature of the measuring point based on the light receiving signal from the temperature sensor 85.

Further, an external light enters the objective lens 79 coaxially with the reflected distance measuring light. The external light which has passed the periphery of the mirror 81 is condensed by the objective lens 79, transmitted through the first reflection surface 78a of the dichroic prism 78, and enters the focusing lens 88. The focusing lens 88 forms an image of the external light on the image pickup element 94 via the Porro prism 89 with a beam splitter. By reflecting one part of the external light by the Porro prism 89 with a beam splitter and entering the image pickup element 94, an image with the measuring point as a center is acquired. Further, an operator can observe the formed image by the objective lens 79 via the ocular lens 92.

It is to be noted that, when automatically tracking the object to be measured, a tracking light is emitted from the light emitting element 73. The tracking light is reflected by the second reflection surface 78b of the dichroic prism 78, and enters the tracking photodetector 83. The arithmetic control module drives a horizontal rotation motor and a vertical rotation motor, which are not shown, based on a light receiving position with respect to the tracking photodetector 83 of the reflected tracking light.

In the sixth embodiment, likewise, the reflected distance measuring light received by the photodetector 76, the infrared light received by the temperature sensor 85 and the visible light received by the image pickup element 94 enter coaxially and at the same time. Therefore, since a temperature of the measuring point where the distance measurement has been performed is measured, and further an image with the measuring point as the center can be acquired, a temperature information and a color information can be highly accurately added with respect to the measuring point.

Figure 12:
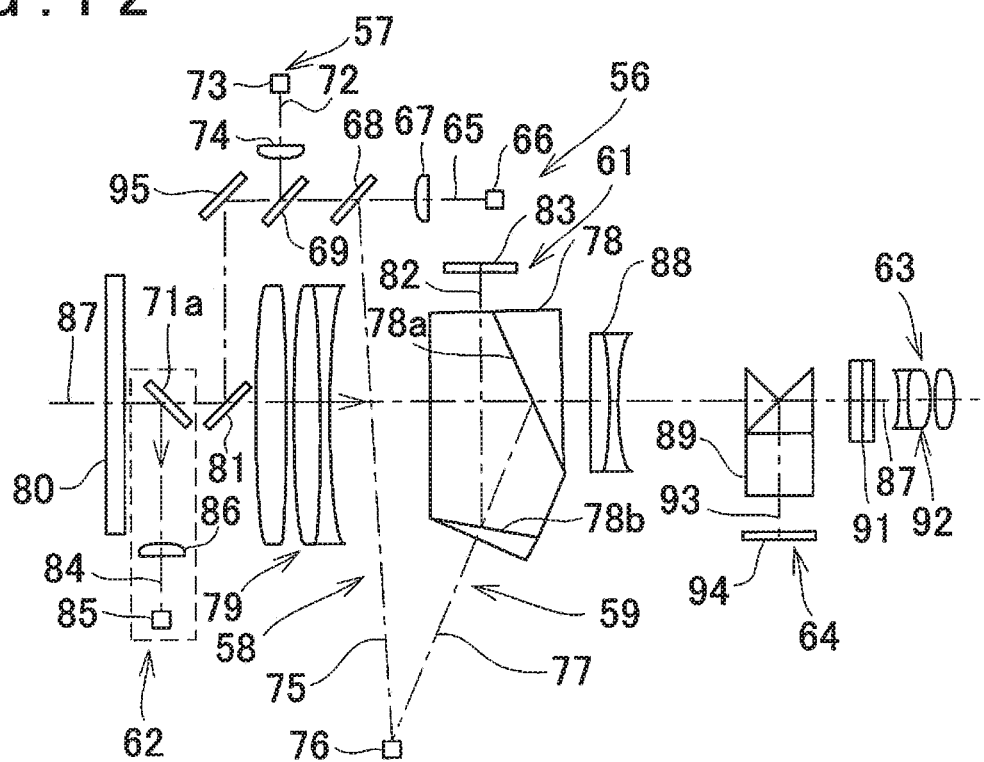
FIG. 12 is a schematical drawing showing an optical system of an optical unit of a total station according to a seventh embodiment of the present invention.

Next, referring to FIG. 12, a description will be given on a seventh embodiment of the present invention. It is to be noted that in FIG. 12, the same components as shown in FIG. 11 are referred by the same symbols, and a detailed description thereof will be omitted.

In the seventh embodiment, an infrared light receiving optical system 62 is provided on an object side away from a mirror 81. Further, a second dichroic mirror 71a as an infrared light separating optical component is provided on a sighting optical axis 87, and an infrared light receiving optical axis 84 is branched from the sighting optical axis 87 by the second dichroic mirror 71a. Further, the second dichroic mirror 71 in the sixth embodiment is replaced by a mirror 95. Further, the second dichroic mirror 71a has an optical characteristic to reflect the infrared light and to transmit through any other lights. Any other structures are the same as the sixth embodiment.

In the seventh embodiment, likewise, since the reflected distance measuring light, the infrared light and the visible light enter coaxially and at the same time, a temperature information and a color information can be highly accurately added with respect to the measuring point.

Figure 13:
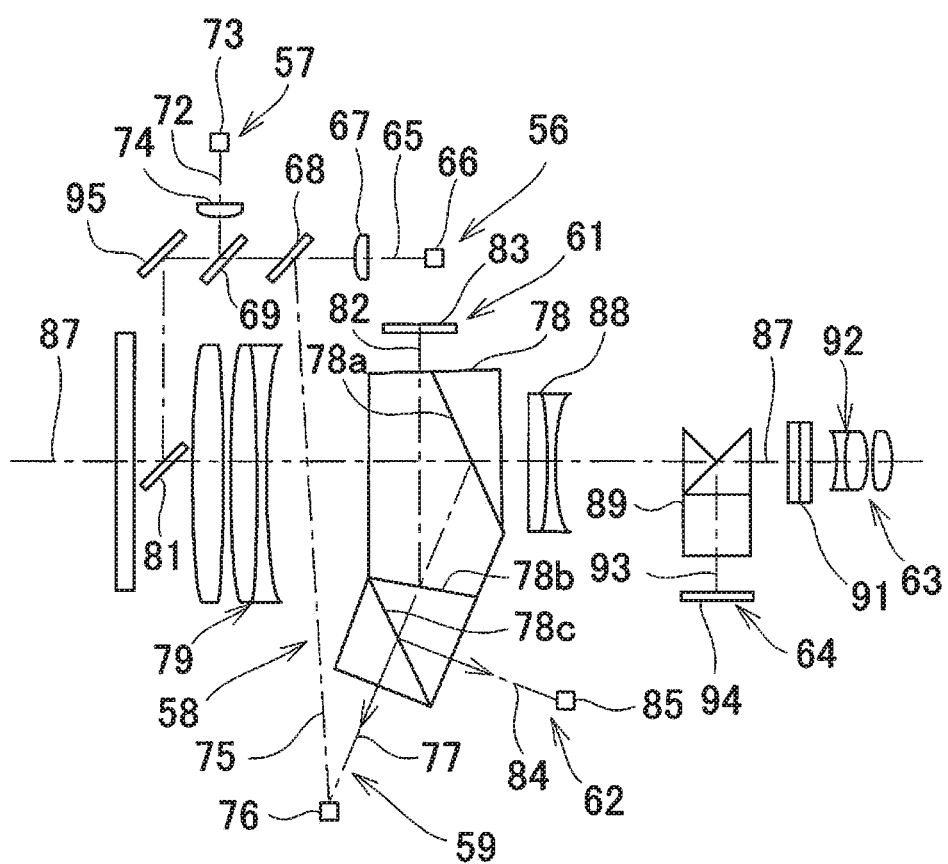
FIG. 13 is a schematical drawing showing an optical system of an optical unit of a total station according to an eighth embodiment of the present invention.

Next, referring to FIG. 13, a description will be given on an eighth embodiment of the present invention. It is to be noted that in FIG. 13, the same components as shown in FIG. 12 are referred by the same symbols, and a detailed description thereof will be omitted.

In the eight embodiment, a third reflection surface 78c as an infrared light separating optical component is further formed on a dichroic prism 78. An infrared light is separated from a reflected distance measuring light by the third reflection surface 78c and enters a temperature sensor 85.

The third reflection surface 78c and the temperature sensor 85 constitute an infrared light receiving optical system 62. Any structures other than the infrared light receiving optical system 62 are the same as the seventh embodiment.

In the eighth embodiment, likewise, since the reflected distance measuring light, the infrared light and the visible light enter coaxially and at the same time, a distance measurement, a temperature measurement and a color information acquisition can be highly accurately performed with respect to the measuring point, and a temperature information and a color information can be highly accurately added to a distance measurement result.

The invention claimed is:

1. A surveying instrument comprising: a light projecting optical system for projecting a distance measuring light to a predetermined measuring point, a light receiving optical system for receiving a reflected distance measuring light from said measuring point, a visible light from said measuring point and an infrared light from said measuring point, an image pickup unit for receiving a visible light from said measuring point, a frame which horizontally rotates around a horizontal rotation shaft by a horizontal rotation motor, a vertical rotating unit which is provided in said frame, vertically rotating around a vertical rotation shaft by a vertical rotation motor, projecting said distance measuring light from said light projecting optical system to said measuring point and making said reflected distance measuring light from said measuring point enter said light receiving optical system, a horizontal angle detector for detecting a horizontal angle of said frame, a vertical angle detector for detecting a vertical angle of said vertical rotating unit, and an arithmetic control module for controlling a distance measurement, a temperature measurement, a rotation of said frame and a rotation of said vertical rotating unit based on light receiving results of said reflected distance measuring light and said infrared light, wherein said light receiving optical system has a photodetector for receiving said reflected distance measuring light, a dichroic mirror provided on an optical path of said reflected distance measuring light for separating the visible light which entered coaxially with said reflected distance measuring light from said reflected distance measuring light, an infrared light separating optical component provided on the optical path of said reflected distance measuring light for separating said infrared light which entered coaxially with said reflected distance measuring light from said reflected distance measuring light, and a temperature sensor for receiving said separated infrared light, wherein said arithmetic control module measures a distance to said measuring point based on light receiving results of said reflected distance measuring light received by said photodetector, acquires an image with said measuring point as a center based on light receiving results of said visible light received by said image pickup unit, measures a temperature of said measuring point based on light receiving results of said infrared light received by said temperature sensor, and coaxially acquires a positional information, a temperature information and a color information of said measuring point by separating the reflected distance measuring light, the infrared light and the visible light which entered the light receiving optical system on the optical path, wherein said vertical rotating unit is a reflection mirror having two reflection surfaces and having a function of said infrared light separating optical component, wherein said photodetector and said temperature sensor are arranged at symmetrical positions interposing said reflection mirror, and wherein said reflection mirror reflects said reflected distance measuring light on one surface and reflects said infrared light on an other surface.

2. The surveying instrument according to claim 1, wherein said light receiving optical system has a light receiving lens for making said photodetector to receive said reflected distance measuring light.

3. The surveying instrument according to claim 1, wherein said arithmetic control module makes said distance measuring light to be scanned by the rotation of said vertical rotating unit.

4. The surveying instrument according to claim 1, wherein said image pickup unit is provided coaxially with said light receiving optical system and acquires an image based on a visible light which entered coaxially with said reflected distance measuring light.

5. The surveying instrument according to claim 2, wherein said image pickup unit is provided coaxially with said light receiving optical system and acquires an image based on a visible light which entered coaxially with said reflected distance measuring light.

6. The surveying instrument according to claim 3, further wherein said image pickup unit is provided coaxially with said light receiving optical system and acquires an image based on a visible light which entered coaxially with said reflected distance measuring light.

\* \* \* \* \*